Figure 1:
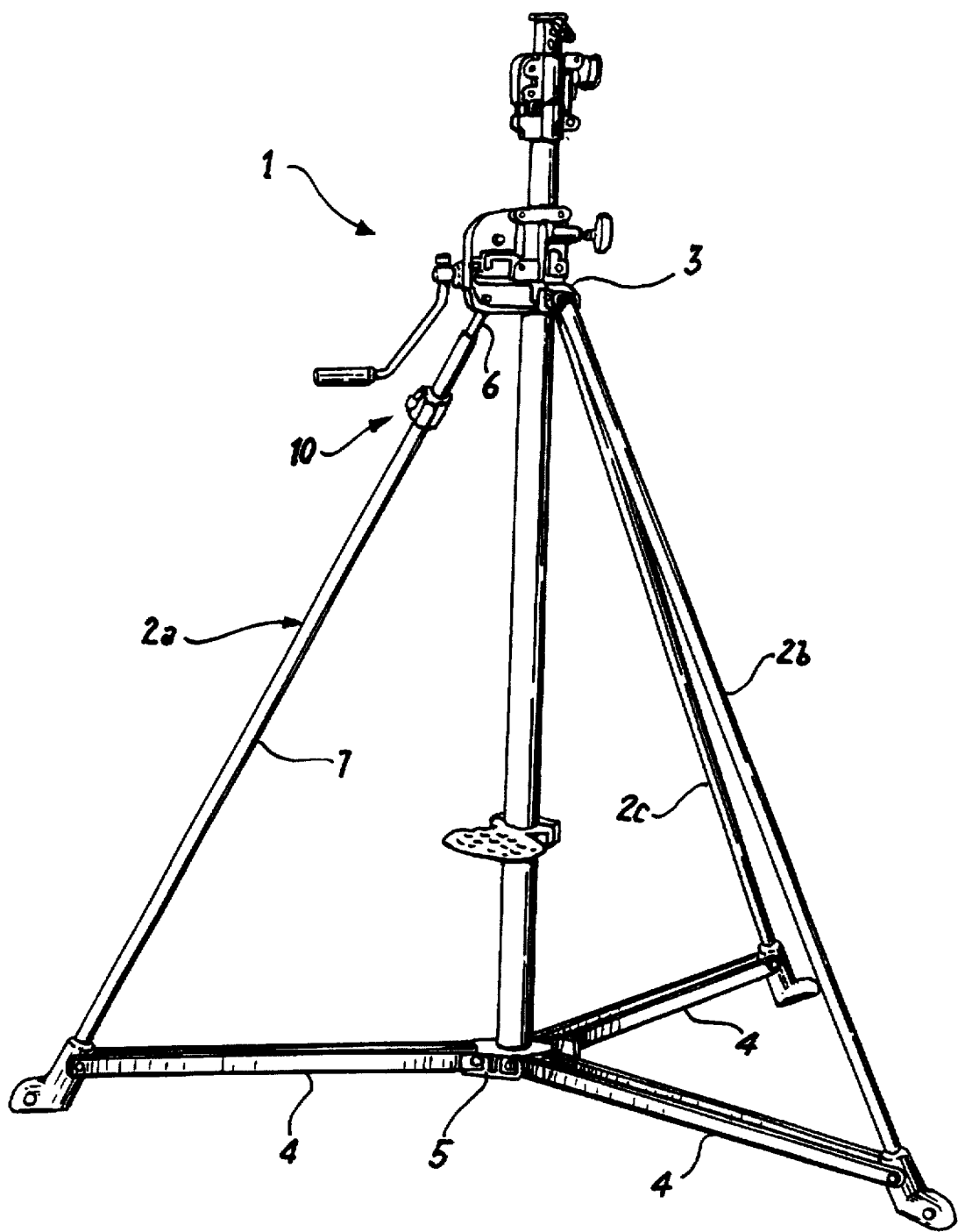

United States Patent [19]
Speggiorin

[11] Patent Number: 5,708,889
[45] Date of Patent: Jan. 13, 1998

[54] DEVICE FOR ADJUSTING THE LENGTH OF AN EXTENDIBLE ROD-LIKE ELEMENT, PARTICULARLY AN EXTENDABLE LEG OF A TRIPOD OR STAND FOR OPTICAL OR PHOTOGRAPHIC EQUIPMENT

[75] Inventor: Paolo Speggiorin, Mussolente, Italy

[73] Assignee: Lino Manfrotto & Co., S.p.A., Bassano Del Grappa, Italy

[21] Appl. No.: 521,073

[22] Filed: Aug. 29, 1995

[51] Int. Cl.$^6$ .................................................. G03B 29/00
[52] U.S. Cl. .................................... 396/428; 248/412
[58] Field of Search ................................ 396/329, 419, 396/428; 248/177.1, 176.3, 412

[56] References Cited

U.S. PATENT DOCUMENTS 2,297,927  10/1942  Whitman ........................... 396/428 X
5,337,100   8/1994  Oxford ................................. 396/428
5,589,903  12/1996  Speggiorin ............................ 396/428

Primary Examiner—Howard B. Blankenship
Attorney, Agent, or Firm—Sughrue, Mion, Zinn, Macpeak & Seas, PLLC

[57] ABSTRACT

Two portions of an extendible rod-like element are joined together in an adjustable manner by means of a device with a external screw thread and an internal screw thread comprising an internally threaded sector movable on one of the portions of the rod-like element from an operative position of engagement with the external screw thread, in which the portions are locked as regards relative sliding, to an inoperative position of disengagement from the external screw thread, in which the portions can slide freely relative to one another. In the operative position, the internally threaded sector can be rotated for a precise adjustment of the extension of the rod-like element whereas, in the inoperative position, it is possible to carry out an approximate and quick adjustment.

8 Claims, 3 Drawing Sheets

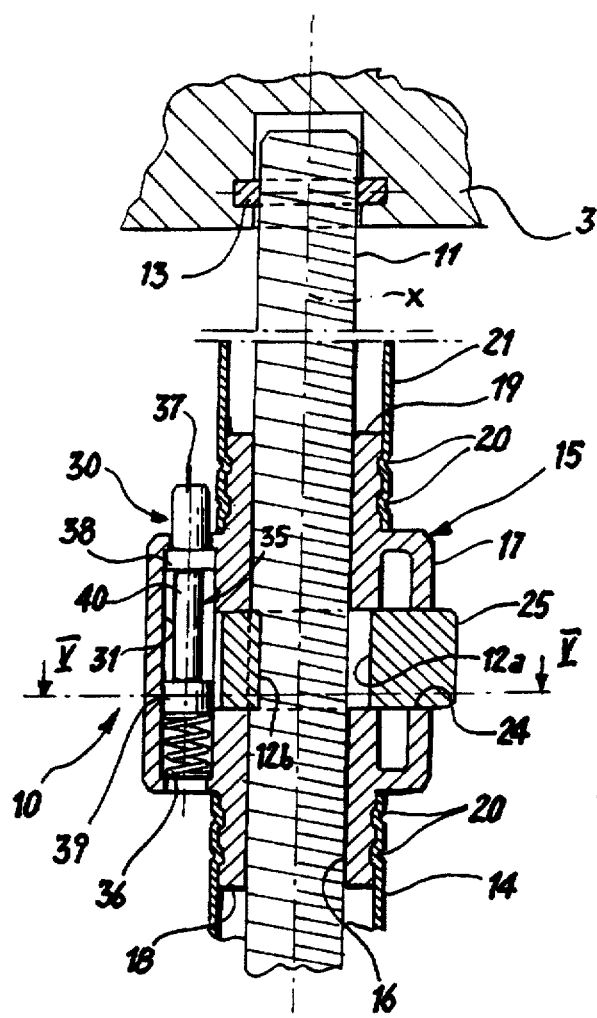
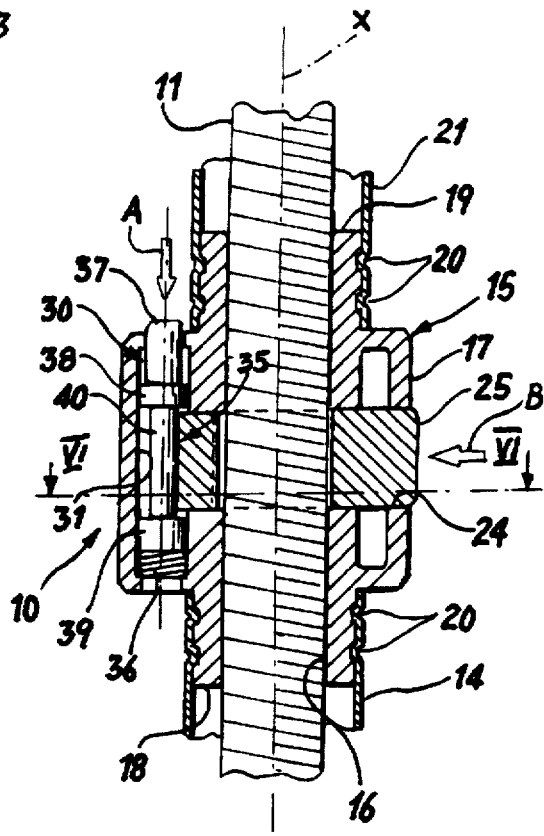
Fig. 3    Fig. 4
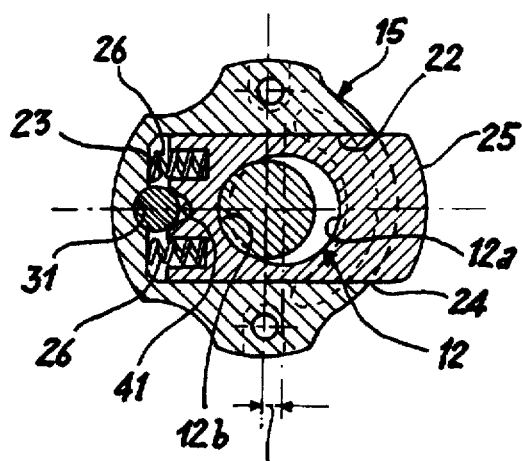
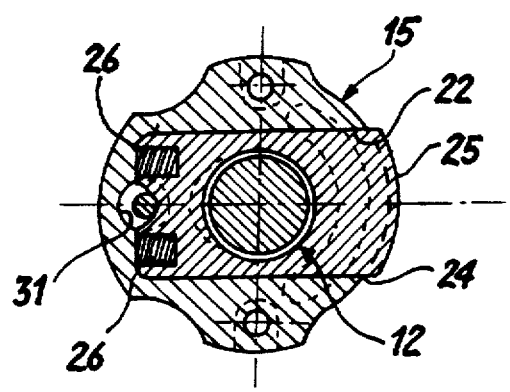
Fig 5    Fig. 6

DEVICE FOR ADJUSTING THE LENGTH OF AN EXTENDIBLE ROD-LIKE ELEMENT, PARTICULARLY AN EXTENDABLE LEG OF A TRIPOD OR STAND FOR OPTICAL OR PHOTOGRAPHIC EQUIPMENT

DESCRIPTION

The present invention relates to a device for adjusting the length of an extendible rod-like element, particularly an extendible leg of a tripod or stand for optical or photographic equipment, of the type in which the rod-like element comprises first and second portions associated slidably with one another by means of the device and the device comprises external and internal screw thread means fixed for translation with the first and second portions, respectively, as well as means for the operative control of the external and internal screw thread means, for moving the portions relative to one another according to the preselected adjustment.

Devices of the type indicated are known, for example, from the Applicant's current production and, conventionally, are used on one of the three legs of a tripod to enable the equipment positioned thereon to be levelled even when the bearing surfaces are on uneven ground.

Two general principles for the operation of the adjustment device can be distinguished and are adapted specifically for favouring the speed and the precision of the adjustment, respectively.

When the speed of positioning of the tripod is to have priority over the precision of the adjustment achieved, adjustment devices are used, in which the two portions of an extendible leg, which can slide freely relative to one another, are clamped by means of levers, grips or similar devices. The adjustment achieved, however, is fairly approximate and not very precise.

If, on the other hand priority is to be given to more precise positioning, adjustment devices of the external-internal screw-thread type are generally used, their operation bringing about relative sliding between the portions of an extendible leg of the tripod.

With devices of the latter type, there is generally the disadvantage that large relative adjustments of the length of the extendible leg can not be carried out quickly.

The problem upon which the present invention is based is that of providing a device for adjusting the length of a rod-like element having a structure and a design such as to overcome all of the disadvantages complained of with reference to the prior art mentioned.

This problem is solved by the invention by means of a device of the type indicated at the beginning, characterized in that the external and internal screw thread means comprise an internally threaded sector movable on the second portion from an operative position of engagement with the external screw thread, in which the portions are locked as regards relative sliding, to an inoperative position of disengagement from the external screw thread, in which the sections can slide freely relative to one another.

Figure 2:
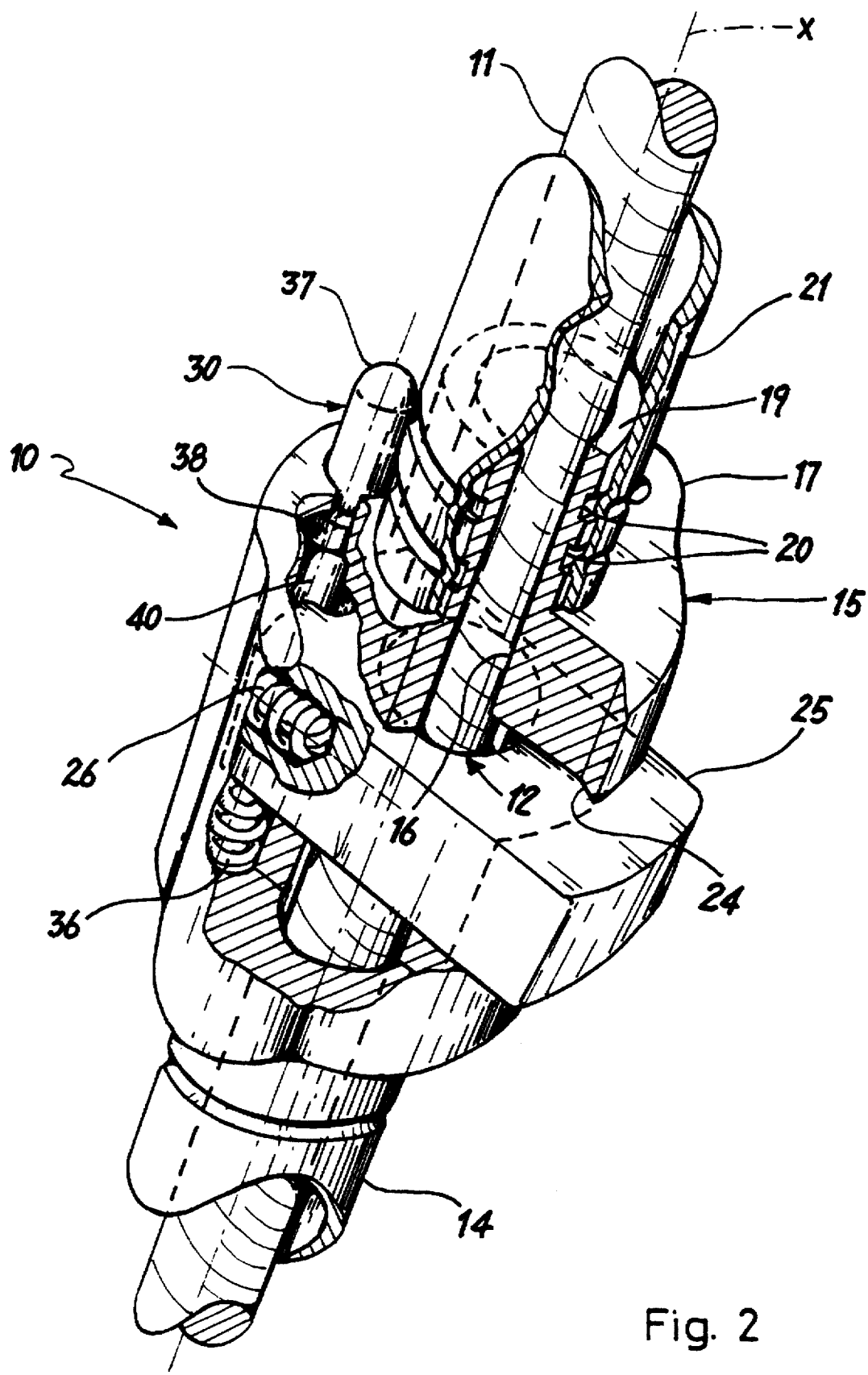

The characteristics and advantages of the invention will become clearer from the following detailed description of a preferred embodiment thereof, described by way of non-limiting example with reference to the appended drawings, in which:

FIG. 1 is a schematic, perspective view of a tripod equipped with an adjustment device according to the present invention, FIG. 2 is a perspective view of the device of FIG. 1, on an enlarged scale and partially in section, FIGS. 3 and 4 are axial sections of the device of FIG. 2 in two different operative conditions, FIGS. 5 and 6 are sections taken on the lines V—V and VI—VI, of the corresponding FIGS. 3 and 4, respectively.

In FIG. 1, a tripod, generally indicated 1, has three legs, 2a, b, c, the longitudinally opposite ends of which are articulated directly to an upper attachment element 3 and, by means of stays 4, to a lower attachment element 5, respectively.

At least one of the legs, indicated 2a, is extendible and, for this purpose, comprises two portions slidable telescopically one inside the other and indicated 6, and 7, respectively. The portions are joined together by a device, generally indicated 10, for adjusting the length of the leg 2a.

The first portion 6 of the leg 2a comprises an externally threaded portion 11 with an axis X, articulated to the upper attachment 3 at one of its ends by means of a pin 13.

The second portion 7 of the leg 2a comprises a tubular element 14 coaxial with the externally threaded portion 11.

The device 10 comprises a sleeve body 15 with an axial through duct 16 in which the externally threaded portion 11 is guided for sliding. The body 15 has an enlarged central portion 17, which constitutes its grip, and two axially opposed appendages 18, 19. Each of the appendages 18, 19 has two circumferential grooves 20 for the anchoring of the tubular element 14 and of a second element 21 extending to protect the externally threaded portion 11, respectively, by means of cold deformation. By means of this device, the body 15 is restrained axially on the end of the tubular element 14 but is free to rotate relative thereto.

A cavity 22 with a blind end 23 and an opposed open end 24 is formed in a position approximately in the middle of the body 15. The cavity 22 is oriented transverse the axis X of the leg 2a and a sliding block 25, restrained for sliding therein, is urged resiliently by springs 26 to project beyond the hole 24. The sliding block 25 has a through-hole 12 extending through it parallel to the axis X.

The hole 12 is formed by the formation, in the sliding block 25, of two parallel holes which have different diameters and which intersect on account of a small disalignment, indicated E, the first, larger-diameter hole having a smooth curved surfacer indicated 12a and the second, smaller-diameter hole, having a curved surface 12b bearing a thread impression constituting an internally threaded, sector. This sector is indicated, by the same reference 12b.

The internally threaded sector 12b extends over a circumferential segment such as to surround the externally threaded portion 11 for no more than half of its circumference.

The externally threaded portion 11 is housed in the hole 12 with a radial clearance such that the internally threaded sector 12b is movable, with the sliding block 25, from an operative position of engagement with the externally threaded portion 11, in which sliding of the latter relative to the tubular element 14 is prevented, to an inoperative position of disengagement from the externally threaded portion 11, in which the latter is free to slide in the tubular element 14.

A safety device 30 is provided for preventing the sliding block 25 from moving accidentally from the operative position to the inoperative position causing the unexpected release of the externally threaded portion 11.

The device 30 comprises a spacer 35 slidable in a seat 31 formed in the body 15 parallel to the axis X and near the end 23. This device 30 carries, at one axial end, a push-button 37 which is kept projecting from the body 15 under the action of a spring 36.

The spacer 35 comprises two annular projections 38, 39 of equal diameter larger than the diameter of a shank 40 connecting the projections.

The device 30 is held axially and guided in the seat 31 by the projections 38,39 and is normally maintained in an operative condition in which the projection 39 interferes with the sliding block 25 in a recess 41 thereof by the spring 36. In this condition, the sliding block 25 with the internally threaded sector 12b is locked in the position of engagement with the externally threaded portion 11. If the push-button 37 is pressed, the device 30 can move to an inoperative condition in which the projection 39 does not interfere with the sliding movement of the sliding block 25 in the cavity 22 so as to enable the internally threaded sector 12b to be disengaged from the externally threaded portion 11 upon demand.

Starting from a condition in which the internally threaded sector 12b is in a position of engagement with the externally threaded portion 11 (FIG. 3), the rotation of the sleeve body 15 about the axis X screws the internally threaded sector 12b relative to the externally threaded portion 11 with consequent relative sliding between the portions 6, 7 of the leg 2a, thus bringing about a precise adjustment of its length.

In order to bring about rapid adjustments of the length of the leg 2a, on the other hand, the push-button 37 is first pressed so as to move it to the inoperative condition of FIG. 4, against the action of the spring 36. This releases the sliding of the sliding block 25 in the direction of the arrow B in FIG. 4, so as to move the internally threaded sector 12b to the position of disengagement from the externally threaded portion 11. With the sliding block 25 kept in the latter position against the action of the springs 26, the externally threaded portion 11 is free to slide in the axial duct 16 of the body 15 so as to permit a rapid, although approximate, adjustment of the leg 2a.

If the sliding block 25 is released close to the preselected adjustment, the internally threaded sector 12b is brought back into engagement with the externally threaded portion 11 by means of the resilient effect of the springs 26 whilst the safety device 30 is returned to the operative condition of FIG. 3 by the resilient effect of the spring 36, thus constituting safety means against the accidental disengagement of the externally threaded portion 11 from the internally threaded sector 12b. In this condition, in the absence of a rotation of the sleeve body 15, the externally threaded portion 11 is locked as regards sliding relative to the tubular element 14.

The invention thus solves the problem set, permitting rapid and precise adjustment of the length of the extendible leg of the tripod.

Amongst the advantages of the device described above, safety against accidental release, non-reversibility of the threaded coupling, and ease of adjustment of the tripod even with only one hand so that the other hand is free to perform other tasks such as supporting the equipment mounted on the tripod, are pointed out.

I claim:

1. A device for adjusting the length of an extendible rod-like element, particularly an extendible leg of a tripod or stand for optical or photographic equipment, in which the rod-like element comprises first and second portions associated slidably with one another by means of the device and the device comprises external and internal screw thread means fixed for translation with the first and second portions, respectively, as well as means for the operative control of the external and internal screw thread means for moving the portions relative to one another according to the preselected adjustment, characterized in that the external and internal screw thread means comprise an internally threaded sector movable on the second portion from an operative position of engagement with the external screw threads means in which the portions are locked as regards relative sliding, to an inoperative position of disengagement from the external screw thread means in which the portions can slide freely relative to one another.

2. A device according to claim 1, in which the internally threaded sector is formed so as to engage the external screw thread means for no more than half of its circumference in the operative position.

3. A device according to claim 1 in which the means for the operative control of the external and internal screw thread means comprise a sleeve body restrained rotatably on the second portion and fixed for rotation with the internally threaded sector in order to rotate it in screwing engagement with the external screw thread means.

4. A device according to claim 3, in which the sleeve body defines an axial duct for the external screw thread means and a cavity intersecting the axial duct, the internally threaded sector being guided for sliding away from and towards the positions in the cavity.

5. A device according to claim 4, in which a sliding block associated with the internally threaded sector is supported for sliding in the cavity of the sleeve body in order to move the internally threaded sector towards the inoperative position of disengagement from the external screw thread means, against the action of resilient means.

6. A device according to claim 3 in which safety means mounted on the sleeve body can interfere with the movement of the internally threaded sector away from and towards the positions, the safety means being able to be switched between an inoperative condition in which the internally threaded sector is free to move towards the position of disengagement from the external screw thread means and an operative condition in which the sector is locked in the position of engagement with the external screw thread means.

7. A device according to claim 6, in which the safety means comprise a push-button acting on a spacer mounted for sliding in the sleeve body and interfering with the sliding block, the spacer comprising a shank with two respective annular projections extending at its opposite axial ends, one of the projections of the spacer being in abutment with the sliding block in the operative condition so as to prevent the disengagement of the external screw thread means from the internally threaded sector.

8. A device according to claim 7, in which the spacer is urged resiliently towards the operative condition.

* * * * *

UNITED STATES PATENT AND TRADEMARK OFFICE
CERTIFICATE OF CORRECTION

PATENT NO.   : 5,708,889
DATED        : January 13, 1998
INVENTOR(S)  : SPEGGIORIN, Paolo It is certified that error appears in the above-identified patent and that said Letters Patent is hereby corrected as shown below:

ON THE TITLE PAGE:
Item [30]

[30] Foreign Application Priority Data
     September 13, 1994    [IT] Italy        PD94A000159

Signed and Sealed this

Sixteenth Day of May, 2000

*Attest:*

Q. TODD DICKINSON

*Attesting Officer*          *Director of Patents and Trademarks*